(12) United States Patent
Dove

(10) Patent No.: US 8,656,195 B2
(45) Date of Patent: Feb. 18, 2014

(54) ENERGY EFFICIENT ETHERNET CONTROL

(75) Inventor: Daniel J Dove, Colfax, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 359 days.

(21) Appl. No.: 13/221,840

(22) Filed: Aug. 30, 2011

(65) Prior Publication Data

US 2013/0054995 A1    Feb. 28, 2013

(51) Int. Cl.
*G06F 1/00* (2006.01)
*G06F 1/26* (2006.01)
*G06F 1/32* (2006.01)

(52) U.S. Cl.
USPC .......................................... 713/300; 713/320

(58) Field of Classification Search
USPC ................................. 713/300, 320
See application file for complete search history.

(56) References Cited

U.S. PATENT DOCUMENTS

| | | | |
|---|---|---|---|
| 4,535,466 A * | 8/1985 | Palvolgyi | 377/54 |
| 7,505,795 B1 | 3/2009 | Lim et al. | |
| 7,551,948 B2 | 6/2009 | Meier et al. | |
| 7,902,694 B2 | 3/2011 | Schindler et al. | |
| 8,195,964 B2 * | 6/2012 | Diab | 713/300 |
| 8,347,121 B2 * | 1/2013 | Matthews et al. | 713/320 |
| 2004/0034806 A1 * | 2/2004 | Klug et al. | 713/320 |
| 2007/0253399 A1 | 11/2007 | Deshpande et al. | |
| 2009/0097392 A1 * | 4/2009 | Diab et al. | 370/201 |
| 2011/0022699 A1 | 1/2011 | Powell et al. | |
| 2011/0022716 A1 | 1/2011 | Diab | |

* cited by examiner

*Primary Examiner* — Mark Connolly

(57) ABSTRACT

A physical layer device includes a pseudo-random number generator, a register, a state machine, and a timer. The pseudo-random value generator is configured to produce a pseudo-random value within a predefined range. The register is configured to receive the pseudo-random value from the pseudo-random value generator and store the pseudo-random value. The state machine is configured to obtain the pseudo-random value from the register and provide the pseudo-random value to a timer within the physical layer device. The timer is configured to control a duration of an Energy Efficient Ethernet time period based on the pseudo-random value.

20 Claims, 8 Drawing Sheets

ENERGY EFFICIENT ETHERNET CONTROL

BACKGROUND

Energy Efficient Ethernet (EEE) is a set of enhancements that provides for less power consumption during low data activity periods on a data link. The Institute of Electrical and Electronics Engineers (IEEE), through the IEEE 802.3az task force, developed this standard and it was ratified in September 2010. EEE essentially reduces power consumption in a data link by implementing a Low-Power Idle (LPI) or "sleep" mode when no data is being sent. Prior Ethernet systems did not include such a mode, and therefore components such as Physical Layer Devices (PHY) for systems that operated at speeds greater than 10 Mbps were active at all times notwithstanding their intermittent use.

BRIEF DESCRIPTION OF THE DRAWINGS

Example embodiments are described in the following detailed description and in reference to the drawings, in which.

DETAILED DESCRIPTION

EEE combines the IEEE 802.3 Media Access Control (MAC) Sublayer with a family of Physical Layers defined to support operation in LPI mode. When the LPI mode is enabled, systems on one or both sides of a link save power during periods of low link utilization. EEE also coordinates transitions to or from a lower level of power consumption, and does this without substantially changing the link status and without substantially dropping or corrupting frames. The transition time in and out of the lower level of power consumption is generally kept small enough to be transparent to upper layer protocols.

EEE supports various types of links, including, but not limited to, twisted pair cabling, electrical backplanes, and/or multi-plane topologies. For operation over twisted pair cabling systems, EEE may support, for example, the 100BASE-TX PHY, the 1000BASE-T PHY, and the 10 GBASE-T PHY. For operation over electrical backplanes, EEE may support, for example, the 1000BASE-KX PHY, the 10 GBASE-KX4 PHY, and the 10 GBASE-KR PHY. EEE may also support XGMII extension using the XGXS for 10 Gb/s PHYs.

Figure 1:
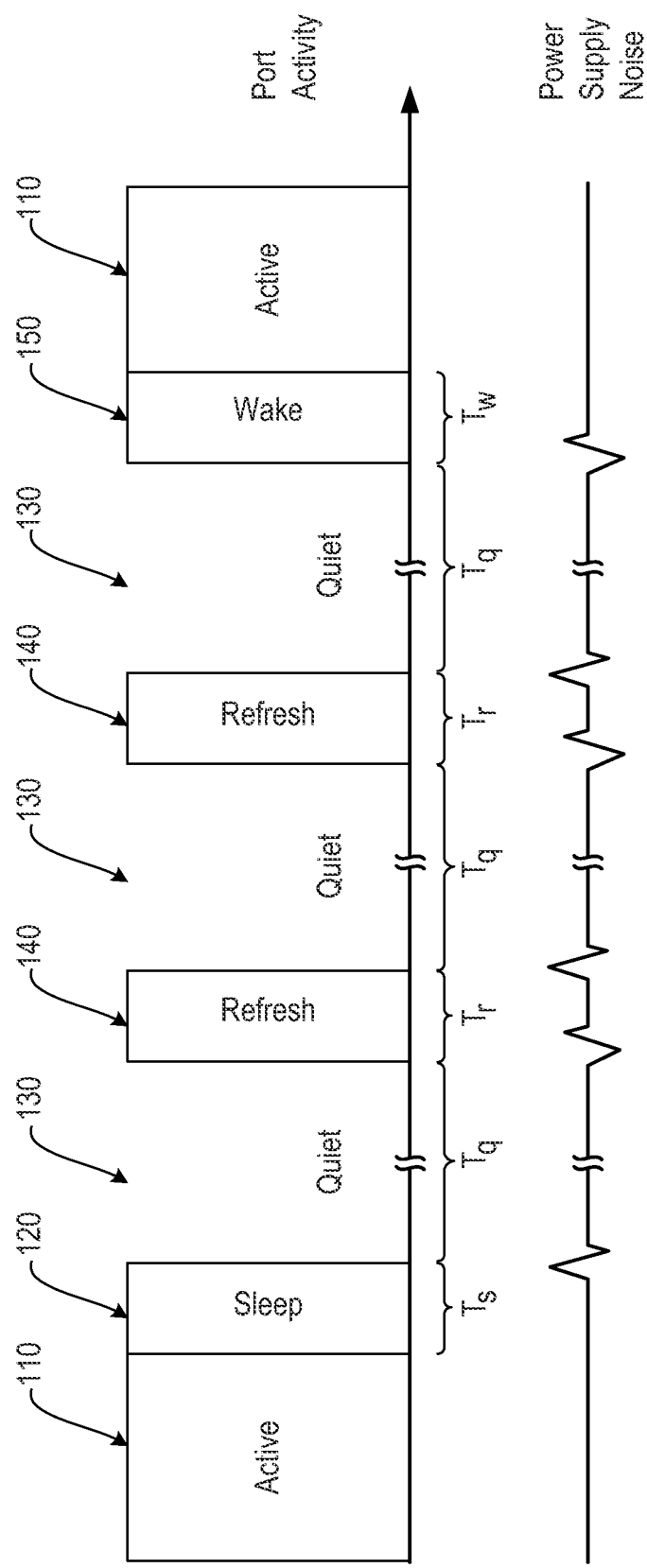
FIG. 1 a graph providing an overview of EEE LPI operation and the associated power supply noise.

FIG. 1 is a graph providing a general overview of EEE LPI operation and the associated power supply noise. As shown, there are five different EEE time periods: the Active period 110, the Sleep period 120, the Quiet period 130, the Refresh period 140, and the Wake period 150. The Active period 110 is the period of time that a PHY device is transmitting/receiving data. The Sleep period 120 is the period of time that a PHY transmits a sleep signal before turning the transmitter/receiver Off or placing the transmitter/receiver a low(er) power state. The Quiet period 130 is the period of time that a PHY remains quiet before sending a refresh signal (i.e., the PHY transmitter/receiver is Off or in a low(er) power state). The Refresh period 140 is the period of time that a PHY transmits a refresh signal and enables its receiver to recover timing and receiver parameters. This signal is transmitted by the PHY periodically and allows a destination or link partner to refresh its timing and receiver parameters. The Wake period 150 is the period of that time a PHY transmits a wake signal which allows the link partner to resume full timing and receiver operations before entering the next Active period 110.

The duration of the Sleep period 120 is $T_s$. The duration of the Quiet period 130 is $T_q$. The duration of the Refresh period 140 is $T_r$. The duration of the Wake period 150 is $T_w$.

In operation, a PHY device may transition between the Active period 110, the Sleep period 120, the Quiet period 130, the Refresh period 140, and the Wake period 150. For example, in instances when there is data to transmit/receive, the PHY may be in an Active state 110. Conversely, in instances when there is no data available to transmit/receive, the PHY may transition from Active 110 to a Low Power Idle (LPI) mode. This may involve transmission of a Sleep signal for duration $T_s$ prior to entering the low(er) power consumption Quiet mode 130. After the PHY enters Quiet mode 130, the PHY may alternate between Quiet intervals 130 and Refresh intervals 140 until there is additional data to transmit. During Quiet intervals 130, the PHY transmitter/receiver may be Off or in a low(er) power state, thereby reducing power consumption and thereby drawing less current from its power supply. During the Refresh intervals 140, the PHY transmitter/receiver may turn back On, and the PHY may, e.g., modify parameters and/or synchronize with its link partner via Refresh signaling. Upon a determination that there is further data to transmit/receive, a PHY may transition back to the Active state 110 via a Wake transition period 150.

Figure 2:
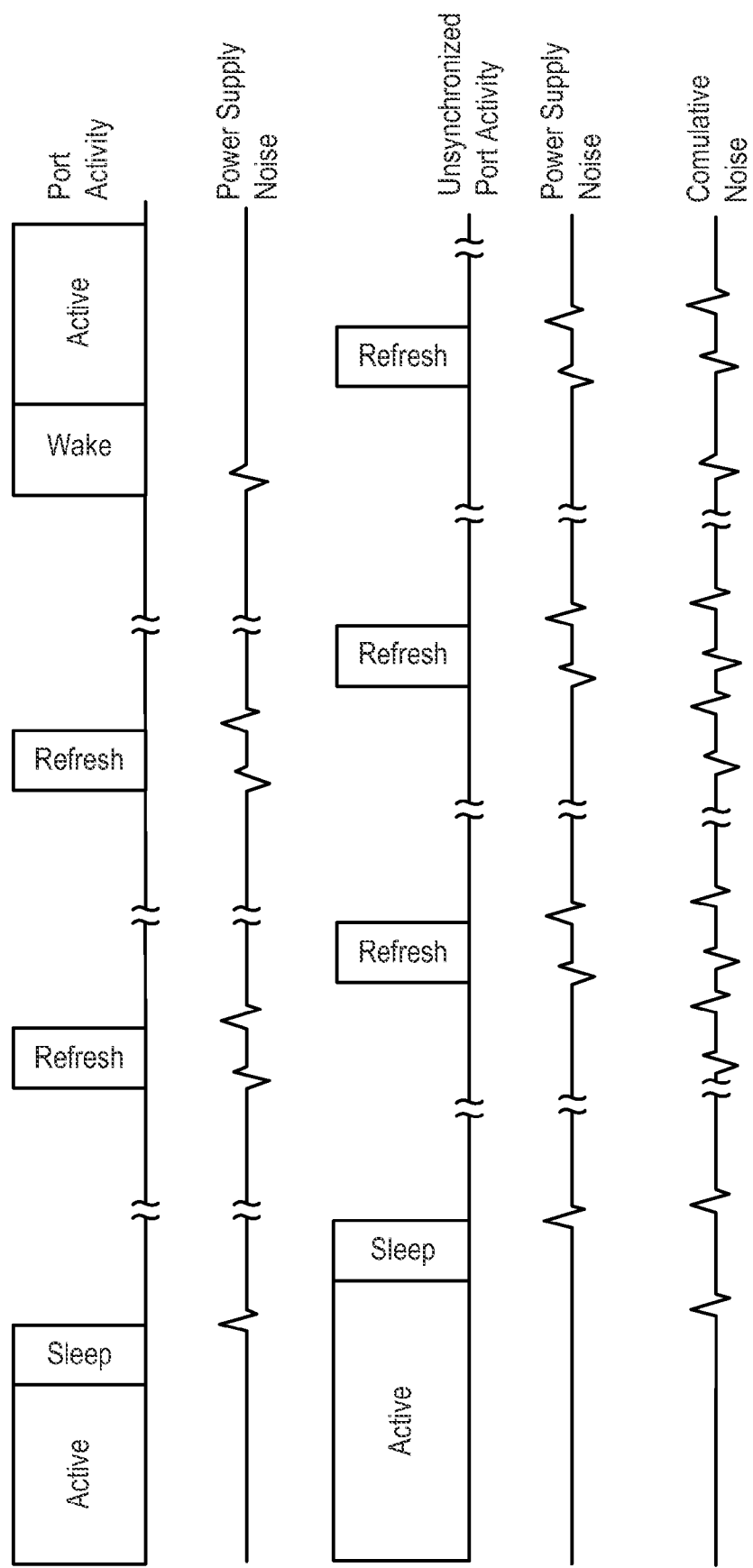
FIG. 2 is a graph illustrating cumulative power supply noise under normal operating conditions.

Under normal operating conditions in a large switch utilizing a plurality of PHY devices (e.g., a 48 port switch), each PHY transmits packets at different times (i.e., each PHY is in Active mode 110 at different times—see different Active periods in FIG. 2). Consequently, each PHY enters and exits the LPI mode at different times, and the PHYs do not turn On/Off or Refresh in a synchronous manner. As a result and as shown in FIG. 2, the current spikes caused by the PHYs entering normal or low power states are spread out over time and easier for the switch power supply circuitry to tolerate without significant noise components.

In contrast, after a synchronizing event, such as the transmission of a broadcast packet, transmission for each PHY may become aligned with respect to time, and, if there is no data available to transmit, each PHY may enter LPI mode at the same moment. As a result, the PHYs may cycle between or periodically repeat the Quiet mode 130 and Refresh mode 140 at substantially the same time (i.e., the PHYs may turn transmitters/receivers On/Off at substantially the same moment). The cumulative impact of the PHYs operating in this synchronized manner leads to large low frequency current spikes with very high di/dt (change in current vs. time) in the switch power supply circuitry.

For example, in a switch with 48 ports and a plurality of PHYs associated with the 48 ports, each port may draw up to 200 mA when transmitting. When the PHYs associated with the ports enter the Quiet period 130, the power consumption may change to 50 mA per port. This 150 mA change at each port may lead to a cumulative change in current of 7.2 A (i.e., 150 mA*48 ports). The 7.2 A change may occur in a time period of 1 µS. This large change in current over such a short period of time may be difficult to manage, and may require large bulk decoupling capacitors combined with inductors and ferrite beads to filter noise created by current transitions. These components may require significant printed circuit board (PCB) space and may cost a significant amount relative to the device generating the noise. Furthermore, the current spikes may cause interference between devices, and potentially disrupt network behavior. For example, the current spikes may cause a sensitive device such as a Serializer/Deserializer (SerDes) which may have synthesizers that are sensitive to low frequency power supply noise to have data errors.

Figure 3:
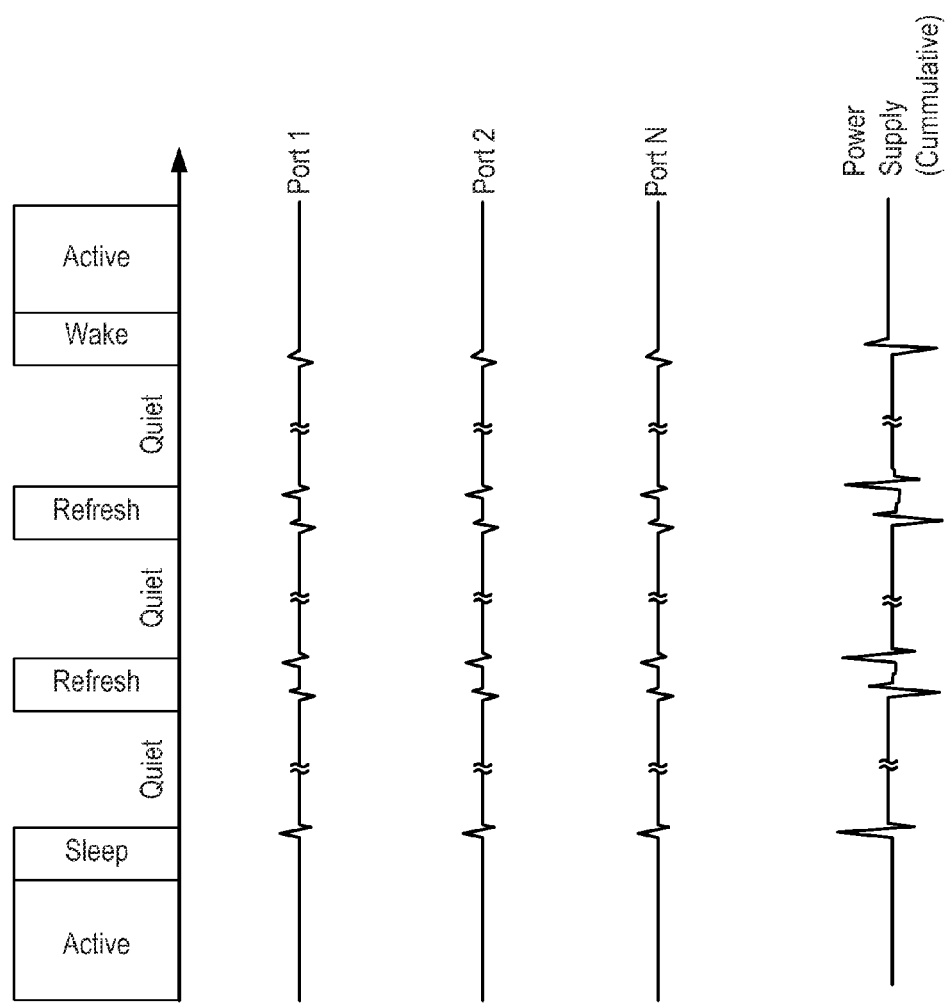
FIG. 3 is a is a graph illustrating the cumulative impact of multiple PHYs on a power supply after a synchronizing event (e.g., transmission of a broadcast packet)

FIG. 3 is a graph illustrating the above-mentioned cumulative impact of multiple PHYs acting in a synchronous manner after a synchronizing event (e.g., transmission of a broadcast packet). In particular, the graph depicts the change in port voltage over time at Ports 1-N during the various EEE modes, and the cumulative impact on the power supply circuitry. As shown, each time Ports 1-N change between Active, Sleep, Quiet, Refresh, and/or Wake, there is a resulting impact on the voltage level at Ports 1-N. This change in voltage necessarily impacts current levels. When such changes occur in a substantially synchronous manner, the cumulative impact on the switch power supply circuitry is significant. Moreover, due to the periodic "refresh" process, the cumulative impact is repetitive. Hence, the switch power supply circuitry must not only withstand significant current spikes caused by multiple PHYs switching from high(er) power modes to low(er) power modes at substantially the same time, but the switch power supply must also withstand repetitive current spikes. This combination of repetitive and significant current changes generally necessitates a filter network with large components (e.g., large bulk decoupling capacitors combined with inductors and ferrite beads to filter noise created by current transitions). This extensive filter network may consume valuable PCB real-estate, add additional manufacturing expense, and add additional potential points of failure.

Embodiments of the present disclosure reduce the probability that a plurality of PHYs would operate synchronously in an EEE environment, and therefore may reduce overall manufacturing expense, PCB real-estate expense, and/or component count. More specifically, embodiments utilize a pseudo-random value generator to randomize timers associated with each PHY. The pseudo-random value generator may assign a pseudo-random value to timer(s) that define the $T_s$, $T_q$, $T_r$, and/or $T_w$ EEE time periods. Each PHY, therefore, has a different $T_s$, $T_q$, $T_r$, and/or $T_w$ duration. In the event of a synchronizing event (e.g., transmission of a broadcast packet), the ports may transition between the Sleep, Quiet, Refresh, and/or Wake modes at different times due to the different $T_s$, $T_q$, $T_r$, and/or $T_w$ time periods defined for each PHY. As a result, the current spikes depicted in FIG. 3 are spread-out over time and the power supply circuitry does not have to withstand the above-mentioned significant and repetitive current spikes caused by the plurality of ports turning On and Off in a synchronous manner. Hence, smaller capacitors and filtering components may be incorporated, and overall manufacturing expense as well as interference between devices may be reduced or eliminated.

Various embodiments include a physical layer device (PHY) comprising a pseudo-random generator, a register, a state machine, and a timer. The pseudo-random value generator may be configured to produce a pseudo-random value within a predefined range. The register may be configured to receive the pseudo-random value from the pseudo-random value generator and store the pseudo-random value. The state machine may be configured to obtain the pseudo-random value from the register and provide the pseudo-random value to a timer within the physical layer device. The timer may be configured to control a duration of an Energy Efficient Ethernet time period based on the pseudo-random value.

The Energy Efficient Ethernet time period may be a Low Power Idle (LPI) time period. For example, the Energy Efficient Ethernet time period may be the amount of time that the physical layer device remains quiet before sending a refresh signal. Alternatively or in addition, the Energy Efficient Ethernet time period may be the amount of time that the physical layer device transmits a refresh signal. Alternatively or in addition, the Energy Efficient Ethernet time period may be the amount of time that the physical layer device transmits a sleep signal before turning a transmitter associated with the physical layer device Off or to a low(er) power state. In each case, the control of the duration of the Energy Efficient Ethernet time period based on the pseudo-random value enables a plurality of physical layer devices in a switch to commence and discontinue respective Energy Efficient Ethernet time periods in a substantially non-synchronous or un-aligned manner. Hence, cumulative and repetitive current changes are reduced or eliminated.

Further embodiments include a switch comprising a power supply and a plurality of physical layer devices. Each physical layer device comprises a pseudo-random generator, a register, a state machine, and a timer. The pseudo-random value generator may be configured to produce a pseudo-random value within a predefined range. The register may be configured to receive the pseudo-random value from the pseudo-random value generator and store the pseudo-random value. The state machine may be configured to obtain the pseudo-random value from the register and provide the pseudo-random value to a timer within the physical layer device. The timer may be configured to control a duration of an Energy Efficient Ethernet time period based on the pseudo-random value.

Still further embodiments are directed to a method. The method may be conducted by components of a physical layer device and comprise initializing the physical layer device, generating a pseudo random number within a number range, storing the pseudo random number in a register, and providing the pseudo random number from a register to a timer, wherein the timer controls a duration of an Energy Efficient Ethernet period time based on the pseudo-random value.

Figure 4:
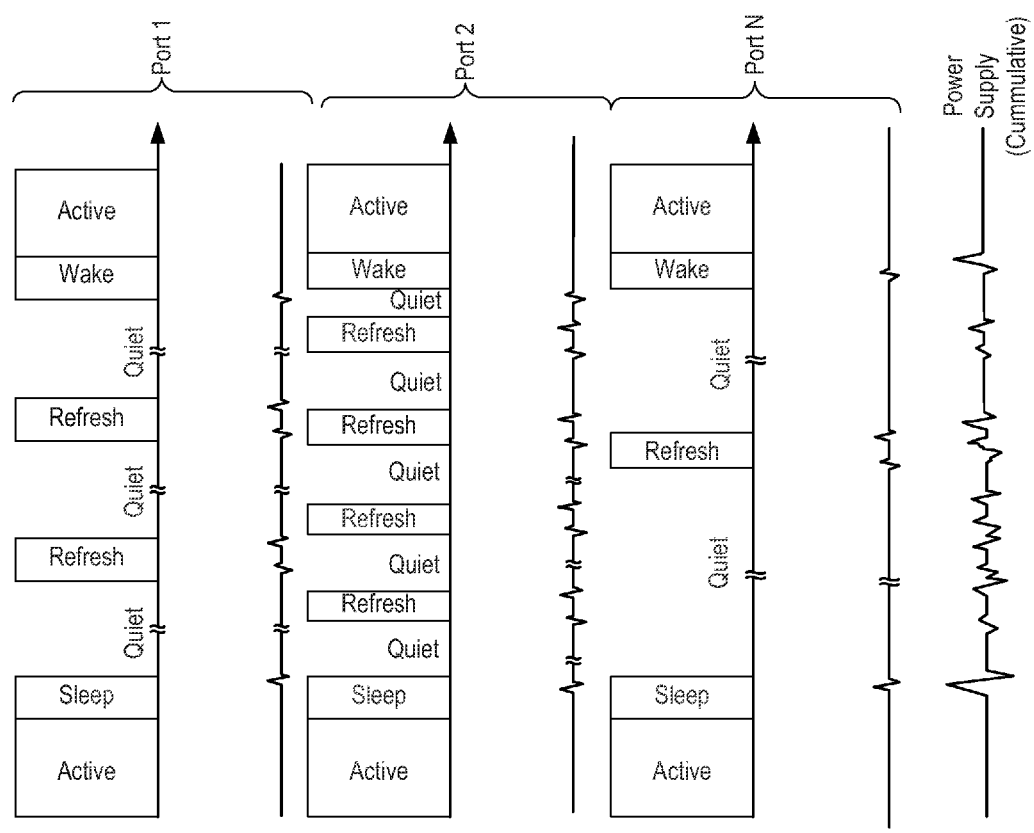
FIG. 4 is a graph illustrating the cumulative impact of multiple PHYs on a power supply after a synchronizing event in accordance with embodiments.

FIG. 4 is a graph illustrating the cumulative impact of multiple PHYs on a power supply after a synchronizing event in accordance with embodiments. More precisely, the graph depicts the change in voltage at Ports 1-N and the cumulative impact on the power supply circuitry when a pseudo-random value is assigned to $T_q$ (i.e., the duration of the Quiet period 130) for each port. As shown, due to a pseudo-random value assignment, $T_q$ for Port 2 is less than $T_q$ for Port 1, and $T_q$ Port N is greater than $T_q$ for Port 1. Accordingly, each port remains Quiet for a different time period, and each port turns On to Refresh at a different time. As a consequence, large and repetitive current spikes caused by the refresh process are substantially reduced. While there may be instances where there is overlap between the Refresh periods of different ports, the time when the port begins the Refresh period is different due to the pseudo-random value assigned to $T_q$.

Figure 5:
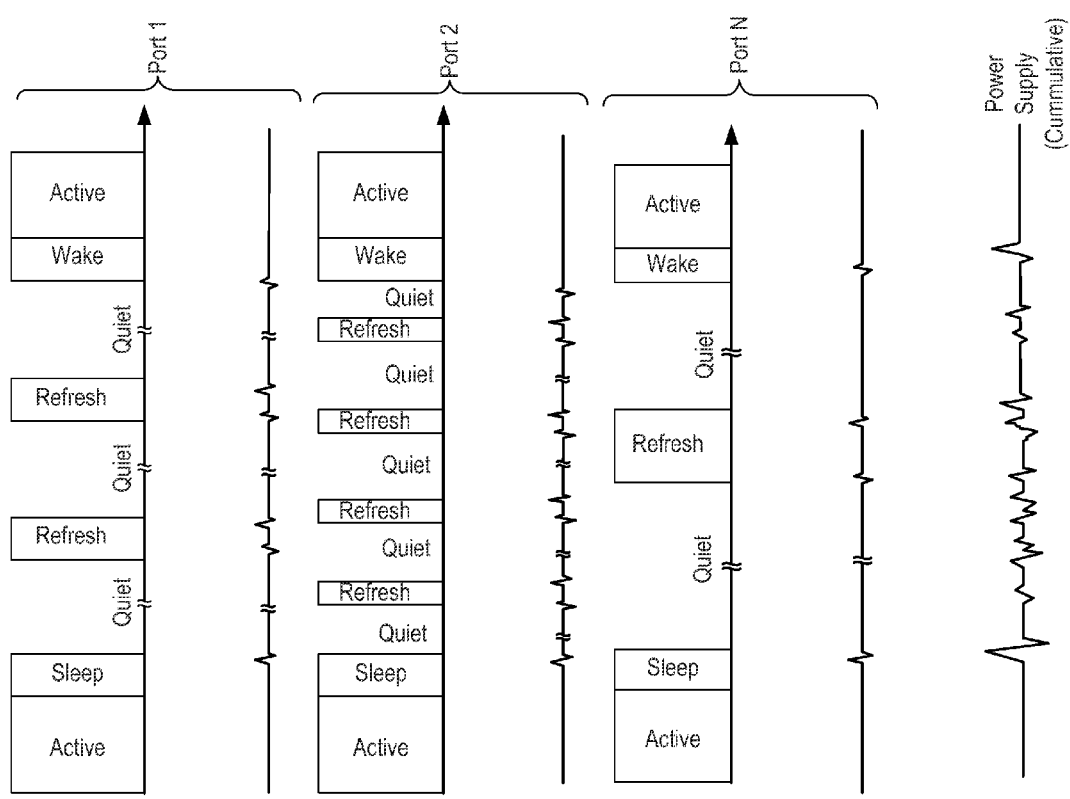
FIG. 5 is another graph illustrating the cumulative impact of multiple PHYs on a power supply after a synchronizing event in accordance with embodiments.

FIG. 5 is similar to the graph in FIG. 4, but in this embodiment, $T_q$ and $T_r$ (i.e., the duration of the Quiet period 130 and Refresh 140 period) are randomized. Due to the pseudo-random value being assigned, $T_q$ and $T_r$ for Port 2 is less than $T_q$ and $T_r$ for Port 1. Therefore, Port 2 stays Quiet for a shorter time period than Port 1, and also conducts Refresh for a shorter time period Port 1. This results in further non-synchronization between Ports 1 and 2 as well as other ports, and therefore further reduces the probability of significant and/or repetitive current spikes.

Of course, pseudo-random values exhibit statistical randomness and are not entirely random. Therefore, there is a small probability that the pseudo-random value generator may define the same value of $T_s$, $T_q$, $T_r$, and/or $T_w$ for a plurality of PHYs. The chance of this occurring, however, is minute, and therefore designers may assume that a large number of PHYs will not be assigned the same value of $T_s$, $T_q$, $T_r$, and/or $T_w$ in most cases.

It should be understood that some values for $T_s$, $T_q$, $T_r$, and/or $T_w$ may be the same for multiple PHYs, while other values for $T_s$, $T_q$, $T_r$, and/or $T_w$ may be randomly generated. For example, and as shown in FIG. 4, the Sleep duration ($T_s$) may be the same for each PHY. Thus, after the transmission of a broadcast packet, each PHY may enter SLEEP and the first Quiet period at the same time. While this may cause a single cumulative current spike, the randomized duration of $T_q$ will reduce or eliminate the repetitive current spikes during the Refresh process. Similarly, with reference to FIG. 5, each PHY may enter SLEEP and the first Quiet period at the same time, but the randomized duration of $T_q$ and $T_r$ will reduce or eliminate repetitive current spikes during the Refresh process.

It should be noted that FIGS. 2-5 depict only a few ports for simplification. The actual number of ports on a switch may be much higher (e.g., 48 or 96 ports), and therefore the cumulative impact on the power supply may be different than the amounts shown in FIGS. 2-5. It should also be noted that FIGS. 2-5 show approximations and are not accurate depictions of actual levels and the cumulative impact that may be seen at a switch power supply.

Figure 6:
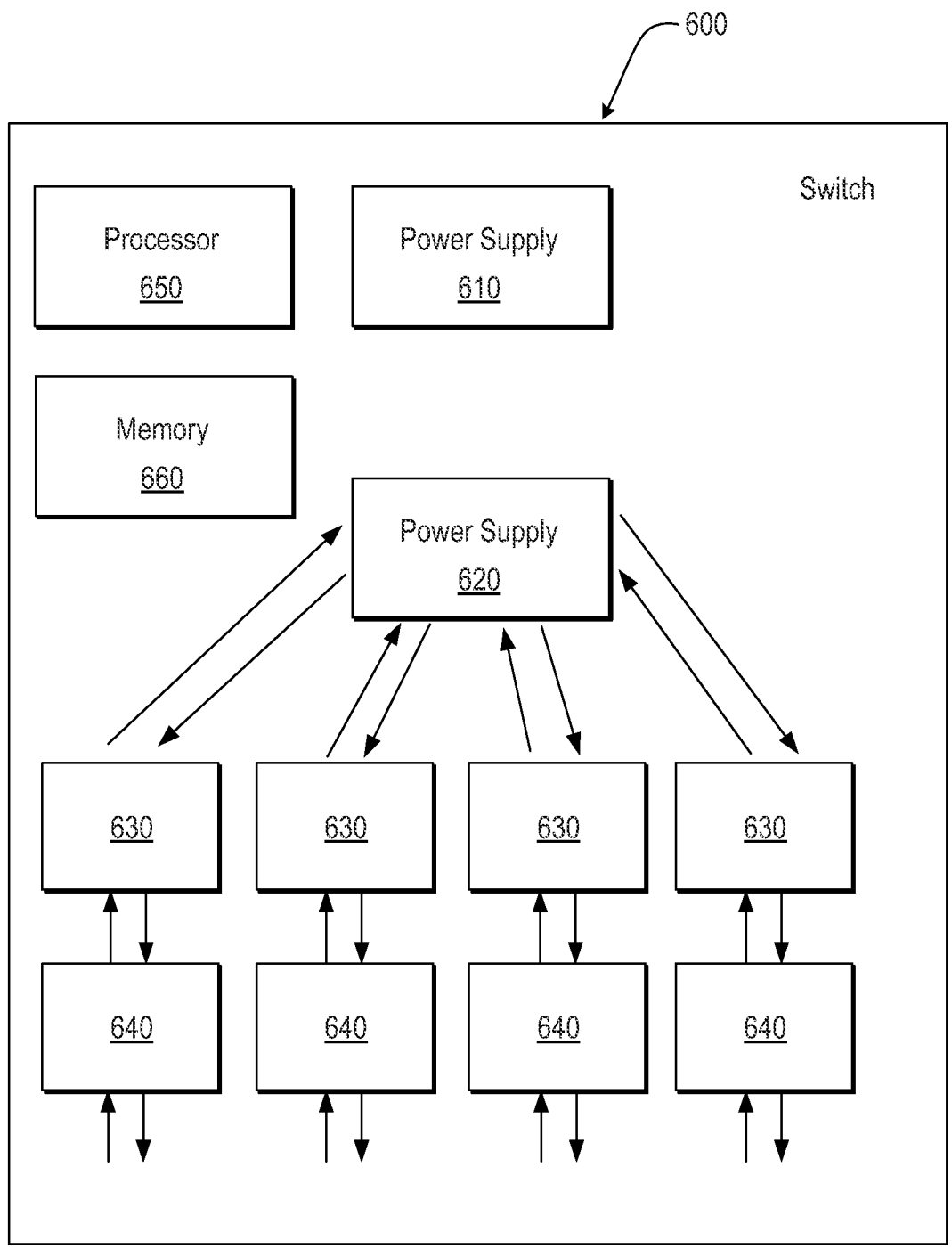
FIG. 6 is a block diagram of a switch comprising a plurality of PHYs in accordance with embodiments.

FIG. 6 is a block diagram illustrating a switch 600 in accordance with embodiments. This switch 600 may be, for example, an Ethernet switch. The switch 600 may comprise a power supply 610, a network switch controller 620, a plurality of PHYs 630, and a plurality of ports 640. While a single PHY is shown for each port, it should be understood that a single PHY may be electronically coupled to multiple ports. For example, a 48-port switch may have 12 PHY devices each coupled to 4 ports (i.e., 4-port PHYs).

Each port 640 may be configured to receive data over a communication medium from a node or link partner and provide the data to the associated PHY 630 and/or receive data from a PHY 630 and transmit the data over a communication medium to the node or link partner. The port 640 may be a physical port configured to couple with a wired input. For example, the port 640 may comprise a RJ45, 8P8C, and/or RJ45S connector.

The PHY 630 may be a device that operates at the physical layer of the OSI network model. The PHY 630 may be a chip that implements hardware transmit and/or receive functions. More specifically, the PHY 630 may be a fully integrated physical layer device supporting multi-rate communications, such as 10 MBps, 100 Mbps, 1 Gbps, 2.5 Gbps, 4 Gbps, 10 Gbps, 40 Gbps, and/or 100 Gbps. The PHY may comprise appropriate code, circuitry, and/or software/firmware to facilitate transmission and/or reception. The PHY may be referred to as a PHY transmitter, PHY receiver, PHY transceiver, PHYceiver, or PHY. The PHY 630 may be configured to conduct operations including, but not limited to, data transfer and packetization. The PHY 630 may be configured to monitor parameters associated with the status of a link (e.g., an Ethernet link) and enter and/or exit the Active mode 110 and LPI mode based on this link monitoring.

The PHY 630 may be electronically coupled to port 640 (or a plurality of ports) and to the switch controller 620. The PHY 630 may receive data from the port 640 and/or transmit data to the port 640. The PHY 630 may also receive data from the switch controller 620 and/or transmit data to the switch controller 620. Although not shown, a Media Access Control (MAC) and Reconciliation Sublayer (RS) may reside between the PHY 630 and the switch controller 620. Power supply 610 may directly or indirectly provide power to the switch controller 620, the PHYs 630, and the ports 640. Processor 650 may execute computer-executable instructions stored thereon or stored on an associated memory 660 to conduct switch operations. Memory 660 may correspond to any typical storage device that stores computer-implemented instructions, such as programming code or the like. For example, the memory 660 may include one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical devices, and flash memory devices.

Figure 7:
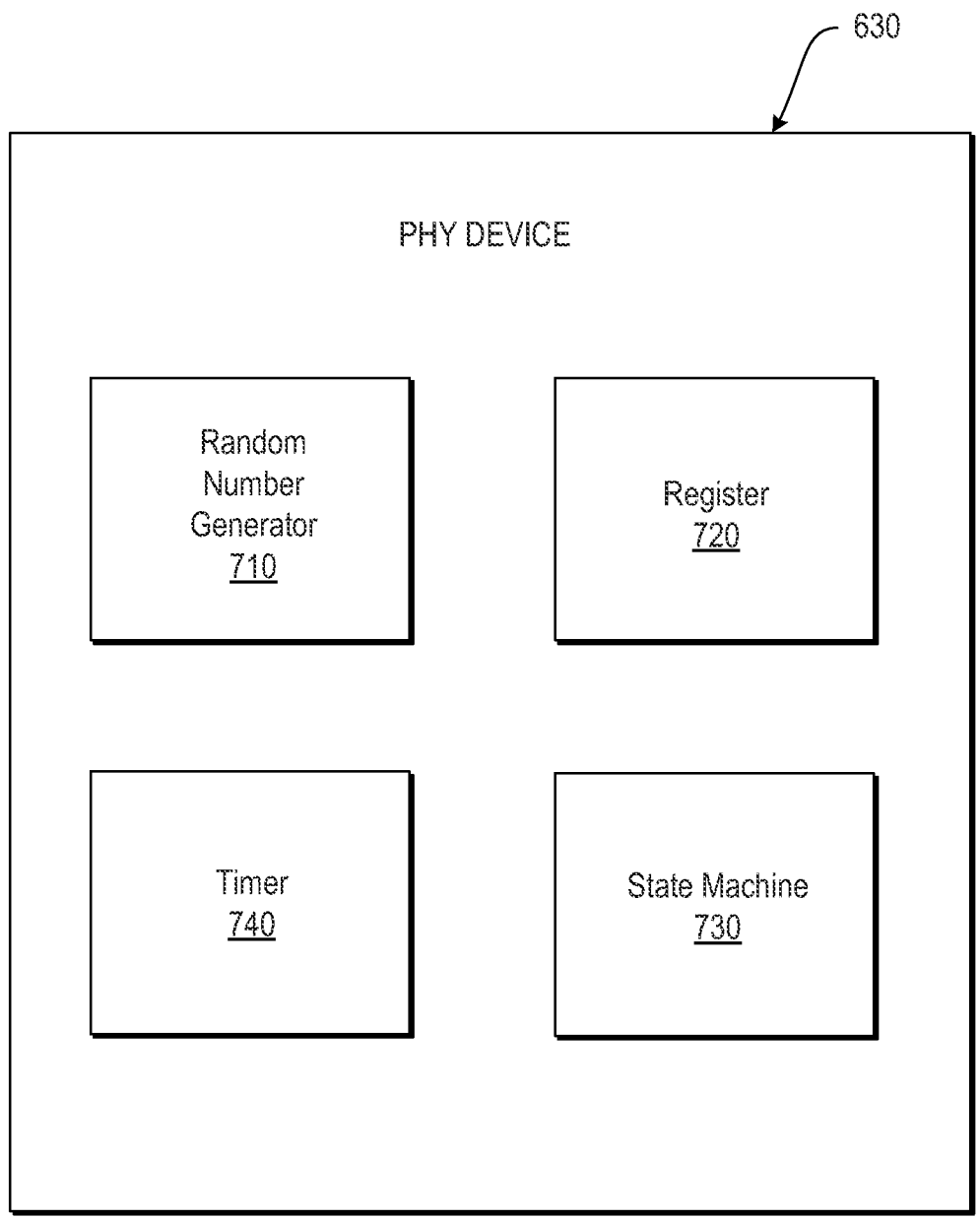
FIG. 7 is a block diagram of a PHY device in accordance with embodiments.

FIG. 7 is block diagram of a PHY device 630 in accordance with embodiments. The PHY may comprise a pseudo-random number generator 710, a register 720, a state machine 730, and a timer 740.

The pseudo-random number generator 710 may be implemented via hardware and/or via software. The pseudo-random number generator 710 may conduct operations consistent with Mersenne twister, Fortuna, Blum Blum Shub, linear congruential generators (LCG), lagged Fibonacci generators (LFG), linear feedback shift registers (LFSR), feedback with carry shift registers (FCSR), and/or generalized feedback shift registers, to name a few. The pseudo-random number generator may be configured to generate a pseudo-random value that is between a minimum and maximum value as defined by the IEEE standard. For example, the pseudo-random number generator may produce a value that is within an acceptable range for $T_s$, $T_q$, $T_r$, and/or $T_w$, as defined by IEEE 802.3az. For instance, the pseudo-random number may be within a number range such as 16-24 mS. In some embodiments, the minimum and maximum range values may be slightly tighter than the minimum and maximum value as defined by IEEE. For example, if IEEE sets the acceptable range of the $T_q$ duration as 16-24 mS, the pseudo-random number generator may be configured to provide numbers between 16.5-23.5 mS.

In some embodiments, the value for $T_s$, $T_q$, $T_r$, and/or $T_w$ may be generated by a hardware random number generator. Such a device may generate random numbers from a physical process. The device may be based on a microscopic phenomenon that generates a low-level, statistically random "noise" signal, such as thermal noise or the photoelectric effect or other quantum phenomena. The hardware random number generator may produce a value that is within an acceptable range for $T_s$, $T_q$, $T_r$, and/or $T_w$, as defined by IEEE 802.3az.

Register 720 may be configured to store the above-mentioned pseudo-random or random value. Register 720 may be hardware configured to store bits of information in a way that a plurality of bits can be written to or read out simultaneously. The register 720 may be, for example, an 8-bit register, a 16-bit register, or a 32-bit register, and may be implemented via register files, standard SRAM, individual flip-flops, high speed core memory, etc. The register may be referred to as a PHY configuration register, a PHY register, or register. The register may be accessible via software and/or hardware. For example, the pseudo-random number may be loaded into the register via software. The pseudo-random number generator may also be loaded into register 620 via a state machine.

State machine 730 may be configured to obtain the pseudo-random number from the register and provide the value to timer 740. This may occur during the state machine operation as part of its initialization process. State machine 630 may be implemented via hardware and/or software. Timer 740 may be electronic and/or software-based. Timer 740 may be a digital timer configured to control the duration of $T_s$, $T_q$, $T_r$, and/or $T_w$. In some embodiments, there may be a single timer for each of $T_s$, $T_q$, $T_r$, and $T_w$. In other embodiments, there may a single timer configured to control $T_s$, $T_q$, $T_r$, and $T_w$.

By assigning pseudo-random numbers to $T_s$, $T_q$, $T_r$, and/or $T_w$, the timer controlling $T_s$, $T_q$, $T_r$, and/or $T_w$ for each PHY in a switch may be initialized with a different value. Hence, the Sleep period 120, Quiet period 130, Refresh Period 140, and/or Wake period 150 may differ for each PHY and/or associated port(s). Consequently and as mentioned above, it is substantially less probable that the timing of various PHYs would align in a repetitive manner. As a result, significant and repetitive current changes may be reduced or eliminated. Designers may therefore reduce the overall switch manufacturing expense by eliminating or reducing the number of large bulk decoupling capacitors combined with inductors and ferrite beads to filter noise created by large the current changes caused by the plurality of PHYs entering Quiet mode and refreshing in unison.

Figure 8:
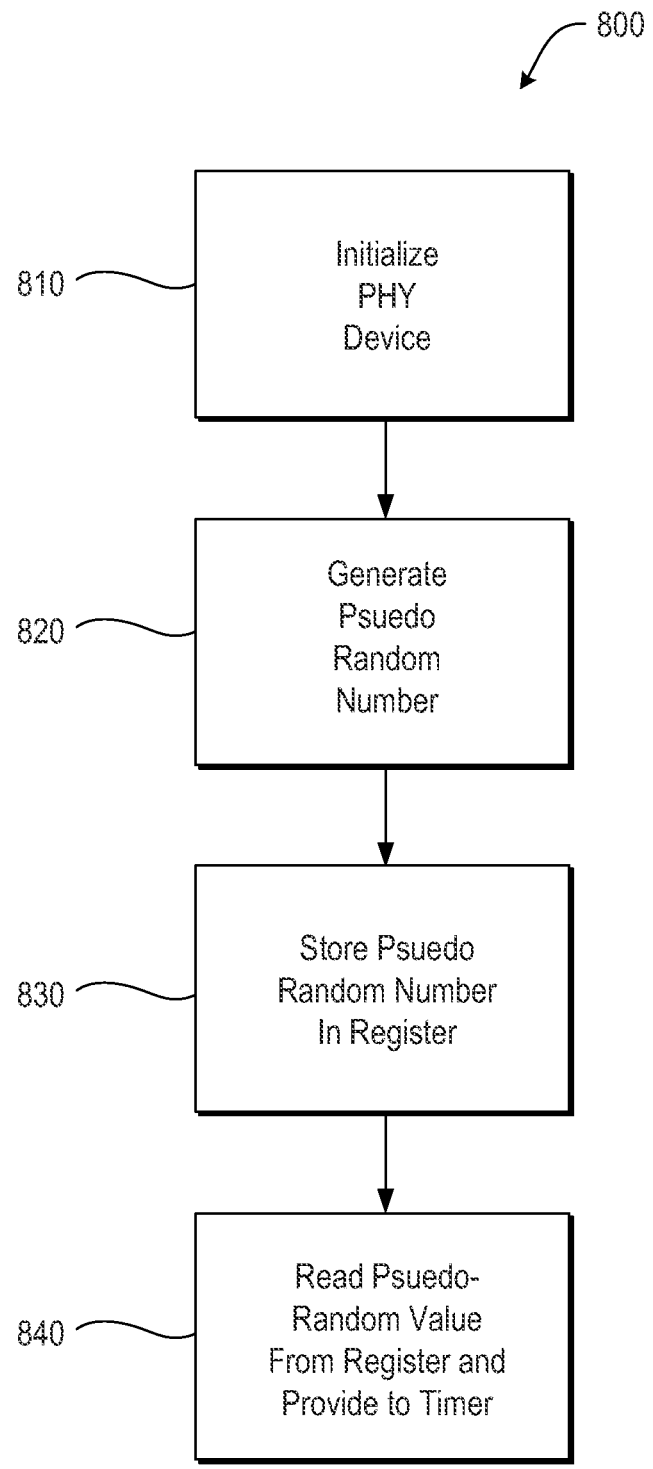
FIG. 8 is a process flow diagram of a method to set the duration of $T_s$, $T_q$, $T_r$, and/or $T_w$ in accordance with embodiments.

FIG. 8 is a process flow diagram of a method in accordance with embodiments of this disclosure. More specifically, FIG. 8 is a process flow diagram of a process to set the duration of $T_s$, $T_q$, $T_r$, and/or $T_w$ in accordance with embodiments of this disclosure. The method 800 may be performed by PHY device 630 in FIG. 6 and FIG. 7.

The method may begin at block 810, wherein a PHY device is initialized. This may comprise, among other things, the software initialization of registers. This initialization may further comprise a power-on reset or a manual reset.

At block 820, a pseudo-random number generator 710 generates a pseudo-random number. This pseudo-random number may be within a numerical range defined by, e.g., IEEE. For example, the pseudo-random number may be within a number range such as 16-24 mS. In some embodiments, the minimum and maximum range values may be slight variants of the minimum and maximum value as defined by IEEE. For example, if IEEE sets the acceptable range of the $T_q$ duration as 16-24 mS, the pseudo-random number generator may be configured to provide numbers between 16.5-23.5 mS.

At block 830, the pseudo-random number is stored in register 720. This may occur after the initialization of the PHY device is complete, but before a link is established. The register may be a hardware register, and the loading to the register may occur via software and/or hardware. The register 720 may be an 8-bit register, a 16-bit register, or a 32-bit register, for example.

At block 840, a state machine 730 reads the pseudo-random number stored in the register and sends the pseudo-random number to timer 740. This may be done during the state machine 730 operation as part of its initialization process. Timer 740 may control the duration of $T_s$, $T_q$, $T_r$, and/or $T_w$. By setting these values pseudo-randomly, multiple PHYs in a switch may act non-synchronously even after a synchronous event, such as the transmission of a broadcast packet. While the PHYs may have similar durations for some EEE time periods (e.g., Sleep and Refresh), by randomizing the duration of at least one EEE time period (e.g., Quiet), the PHYs do not enter/exit Quiet mode at the same time, and therefore the respective current spikes caused by numerous PHYs/ports turning On/Off at substantially the same time reduced or eliminated.

For example, a 48-port switch power supply may see 48*200 mA/100 nS current change (96 million amps/second rate of change) with a period of 20 Hz when multiple PHYs synchronously transition from Quiet mode to Refresh mode. This large periodic current change is very difficult to decouple. By randomizing the $T_s$, $T_q$, $T_r$, and/or $T_w$ values such that they remain within limits defined by IEEE 802.3az, but different from each other, each PHY and associated ports may transition independently and thus the instantaneous current changing on the power supply is 200 mA/100 nS (i.e., 48 times less than when the PHYs/ports act synchronously). And, just as importantly, there is no correlated periodic energy. Each port's frequency of transitioning from Quiet mode to Refresh mode is different and thus no large periodic spikes occur.

Below is table showing how values may be assigned to $T_s$, $T_q$, $T_r$, and/or $T_w$ in an example and in accordance with embodiments.

|       | PHY1 | PHY2 | PHY3 | PHY4 | PHY5 | PHY6 | PHY7 | PHY8 |
|-------|------|------|------|------|------|------|------|------|
| $T_s$ | 210 μS | 210 μS | 210 μS | 210 μS | 210 μS | 210 μS | 210 μS | 210 μS |
| $T_q$ | 20100 μS | 20987 μS | 20682 μS | 21958 μS | 20354 μS | 20055 μS | 21458 μS | 21124 μS |
| $T_r$ | 200 μS | 200 μS | 200 μS | 200 μS | 200 μS | 200 μS | 200 μS | 210 μS |
| $T_w$ | 200 μS | 200 μS | 200 μS | 200 μS | 200 μS | 200 μS | 200 μS | 210 μS |

In this example, the durations of $T_s$, $T_r$, and $T_w$ remain constant for PHY1-8. The value of $T_q$, however, is randomly or pseudo-randomly generated for PHY1-8. More specifically, the value of $T_q$ is randomly generated between 20,000 and 22,000 micro-seconds based on the minimum/maximum values for the 100BASE-TX protocol as set forth by IEEE 802.3az.

The table provided below provides additional minimum/maximum values for different protocols as set forth by IEEE 802.3az. While these values may be used in various embodiments to set a range for the pseudo-random number generators, they should not be seen as limiting and other ranges and/or protocols may be used in embodiments.

| Protocol | $T_s$ µs (min/max) | $T_q$ µs (min/max) | $T_r$ µs (min/max) |
|---|---|---|---|
| 100BASE-TX | 200/220 | 20,000/22,000 | 200/220 |
| 1000BASE-T | 182/20.2 | 20,000/24,000 | 198, 218.2 |
| 1000BASE-KX | 19.9/20.1 | 2,500/2,600 | 19.9/20.1 |
| XGXS (XAUI) | 19.9/20.1 | 2,500/2,600 | 19.9/20.1 |
| 10GBASE-KX4 | 19.9/20.1 | 2,500/2,600 | 19.9/20.1 |
| 10GBASE-KR | 4.9/5.1 | 1,700/1,800 | 16.9/17.5 |
| 10GBASE-T | 2.88/3.2 | 39.68/39.68 | 1.28/1.28 |

As shown, the ranges for various EEE parameters differ based on the applicable protocol. Embodiments of this disclosure use a pseudo-random or random number generator to produce values within these ranges for $T_s$, $T_q$, $T_r$, and/or $T_w$. These values may be provided to timers via registers and/or state machines to control the duration that PHYs and associated ports are in various EEE states. By having at least one of $T_s$, $T_q$, $T_r$, and/or $T_w$ randomly generated, PHYs and associated ports are not substantially synchronous and the cumulative impact of EEE LPI state changing is reduced.

What is claimed is:

1. A physical layer device comprising:
a pseudo-random value generator to produce a pseudo-random value within a predefined range;
a register to receive the pseudo-random value from the pseudo-random value generator and store the pseudo-random value;
a state machine to obtain the pseudo-random value from the register and provide the pseudo-random value to a timer within the physical layer device; and
the timer to control a duration of an Energy Efficient Ethernet time period based on the pseudo-random value,
wherein the control of the duration of the Energy Efficient Ethernet time period based on the pseudo-random value enables a plurality of physical layer devices in a switch to commence and discontinue the Energy Efficient Ethernet time period in a substantially non-synchronous manner.

2. The physical layer device of claim 1, wherein the Energy Efficient Ethernet time period is a Low Power Idle (LPI) time period.

3. The physical layer device of claim 2, wherein the LPI period comprises one or more of a sleep period, a quiet period, and a refresh period.

4. The physical layer device of claim 1, wherein the Energy Efficient Ethernet time period is the amount of time that the physical layer device remains quiet before sending a refresh signal.

5. The physical layer device of claim 1, wherein the Energy Efficient Ethernet time period is the amount of time that the physical layer device transmits a refresh signal.

6. The physical layer device of claim 1, wherein the Energy Efficient Ethernet time period is the amount of time that the physical layer device transmits a sleep signal before turning a transmitter associated with the physical layer device off.

7. A switch comprising:
a power supply; and
a plurality of physical layer devices, each physical layer device comprising:
a pseudo-random value generator to produce a pseudo-random value within a predefined range;
a register to receive the pseudo-random value from the pseudo-random value generator and store the pseudo-random value;
a state machine to obtain the pseudo-random value from the register and provide the pseudo-random value to a timer within the physical layer device; and
the timer to control a duration of an Energy Efficient Ethernet time period based on the pseudo-random value,
wherein the control of the duration of the Energy Efficient Ethernet time period based on the pseudo-random value enables the plurality of physical layer devices to commence and discontinue the Energy Efficient Ethernet time period in a substantially non-synchronous manner.

8. The switch of claim 7, wherein the Energy Efficient Ethernet period is a Low Power Idle (LPI) time period.

9. The switch of claim 7, wherein the Energy Efficient Ethernet time period is the amount of time that each physical layer device remains quiet before sending a refresh signal.

10. The switch of claim 7, wherein the Energy Efficient Ethernet time period is the amount of time that each physical layer device transmits a refresh signal.

11. The switch of claim 7, wherein the Energy Efficient Ethernet time period is the amount of time that each physical layer device transmits a sleep signal before turning a transmitter associated with the physical layer device off.

12. The switch of claim 7, wherein the switch comprises an Ethernet switch.

13. A method comprising:
initializing a physical layer device;
generating a number within a number range;
storing the number; and
providing the number to a timer,
wherein the timer controls a duration of an Energy Efficient Ethernet period time based on the number, and
wherein the control of the duration of the Energy Efficient Ethernet time period based on the number enables a plurality of physical layer devices to commence and discontinue the Energy Efficient Ethernet time period in a substantially non-synchronous manner.

14. The method of claim 13, wherein the Energy Efficient Ethernet time period is a Low Power Idle (LPI) period.

15. The method of claim 14, wherein the LPI period comprises one or more of a sleep period, a quiet period, and a refresh period.

16. The method of claim 13, wherein the Energy Efficient Ethernet time period is the amount of time that the physical layer device remains quiet before sending a refresh signal.

17. The method of claim 13, wherein the number is a pseudo random number.

18. The method of claim 13, wherein the Energy Efficient Ethernet time period is the amount of time that the physical layer device transmits a refresh signal.

19. The method of claim 13, wherein the Energy Efficient Ethernet time period is the amount of time that the physical layer device transmits a sleep signal before turning a transmitter associated with the physical layer device off.

20. The method of claim 17, wherein a state machine provides the pseudo random number from a register to the timer.

* * * * *